US009825284B2

(12) United States Patent
Binder et al.

(10) Patent No.: US 9,825,284 B2
(45) Date of Patent: Nov. 21, 2017

(54) DOPED SPINEL, METHOD FOR THE PRODUCTION THEREOF, THE USE THEREOF AND LITHIUM-ION BATTERY

(71) Applicant: KARLSRUHER INSTITUT FUER TECHNOLOGIE, Karlsruhe (DE)

(72) Inventors: Joachim Binder, Karlsruhe (DE); Sven Glatthaar, Karlsruhe (DE); Melanie Schroeder, Dueren (DE)

(73) Assignee: KARLSRUHER INSTITUT FUER TECHNOLOGIE, Karlsruhe (DE)

( * ) Notice: Subject to any disclaimer, the term of this patent is extended or adjusted under 35 U.S.C. 154(b) by 0 days.

(21) Appl. No.: 14/389,767

(22) PCT Filed: Mar. 28, 2013

(86) PCT No.: PCT/EP2013/000944
§ 371 (c)(1),
(2) Date: Oct. 1, 2014

(87) PCT Pub. No.: WO2013/149716
PCT Pub. Date: Oct. 10, 2013

(65) Prior Publication Data
US 2015/0089797 A1    Apr. 2, 2015

(30) Foreign Application Priority Data

Apr. 2, 2012 (DE) .................. 10 2012 102 831

(51) Int. Cl.
| | |
|---|---|
| *H01M 4/1315* | (2010.01) |
| *C01G 45/12* | (2006.01) |
| *H01M 4/505* | (2010.01) |
| *H01M 4/525* | (2010.01) |
| *C01B 11/24* | (2006.01) |
| *H01M 4/485* | (2010.01) |
| *H01M 4/54* | (2006.01) |
| *H01M 10/058* | (2010.01) |
| *H01M 10/0525* | (2010.01) |

(52) U.S. Cl.
CPC .......... *H01M 4/1315* (2013.01); *C01B 11/24* (2013.01); *C01G 45/1242* (2013.01); *H01M 4/485* (2013.01); *H01M 4/505* (2013.01); *H01M 4/525* (2013.01); *H01M 4/54* (2013.01); *H01M 10/058* (2013.01); *C01P 2002/32* (2013.01); *C01P 2002/52* (2013.01); *C01P 2006/12* (2013.01); *C01P 2006/40* (2013.01); *H01M 10/0525* (2013.01); *Y10T 29/49108* (2015.01)

(58) Field of Classification Search
CPC ...... H01M 10/058; H01M 4/485; C01B 11/24
USPC ..................... 252/182.1; 29/623.1
See application file for complete search history.

(56) References Cited

U.S. PATENT DOCUMENTS

| | | | |
|---|---|---|---|
| 5,674,645 A | 10/1997 | Amatucci et al. | |
| 5,759,720 A | 6/1998 | Amatucci | |
| 7,435,402 B2 * | 10/2008 | Kang | H01M 4/131 |
| | | | 252/518.1 |
| 2008/0157027 A1 | 7/2008 | Manthiram et al. | |
| 2010/0183925 A1 | 7/2010 | Manthiram et al. | |
| 2011/0143912 A1 * | 6/2011 | Menke | C04B 35/44 |
| | | | 501/137 |

FOREIGN PATENT DOCUMENTS

| | | | |
|---|---|---|---|
| WO | WO 2008/039808 A2 | 4/2008 | |
| WO | WO 2012165020 A1 * | 12/2012 | ............ H01M 4/505 |

OTHER PUBLICATIONS

STIC Search by J. Wang.*
W. Choi et al.: "Factors Controlling the Fluorine Content and the Electrochemical Performance of Spinel Oxyfluoride Cathodes", Journal of the Electrochemical Society, vol. 154, No. 8, pp. A792-A797 (2007).
G. Arnold et al.: "Fine-particle lithium iron phosphate LiFePO$_4$ synthesized by a new low-cost aqueous precipitation technique", Journal of Power Sources, vol. 119-121, pp. 247-251 (2003).
T. Yang et al.: "The influence of holding time on the performance of LiNi$_{0.5}$Mn$_{1.5}$O$_4$ cathode for lithium ion battery", Journal of Alloys and Compounds, vol. 502, pp. 215-219 (2010).
M. Kunduraci et al.: "High-Power Nanostructured LiMn$_{2-x}$Ni$_x$O$_4$ High-Voltage Lithium-Ion Battery Electrode Materials: Electrochemical Impact of Electronic Conductivity and Morphology", Chem. Mater., vol. 18, pp. 3585-3592 (2006).
R. Santiianam et al.: "Research progress in high voltage spinel LiNi$_{0.5}$Mn$_{1.5}$O$_4$ material", Journal of Power Sources, vol. 195, pp. 5442-5451 (2010).
G. Q. Liu et al.: "Spinel LiNi$_{0.5}$Mn$_{1.5}$O$_4$ and its derivatives as cathodes for high-voltage Li-ion batteries", J Solid State Electrochem, vol. 14, pp. 2191-2202 (2010).
T.-F. Yi et al.: "Recent developments in the doping of LiNi$_{0.5}$Mn$_{1.5}$O$_4$ cathode material for 5 V lithium-ion batteries", Ionics, vol. 17, pp. 383-389 (2011).
J. B. Goodenough et al.: "Challenges for rechargeable batteries", Journal of Power Sources, vol. 196, pp. 6688-6694 (2011).
K. Amine et al.: "A New Three-Volt Spinel Li$_{1+x}$Mn$_{1.5}$Ni$_{0.5}$O$_4$ for Secondary Lithium Batteries", J. Electrochem. Soc., vol. 143, No. 5, pp. 1607-1613 (1996).
P. Strobel et al.: "Structural, magnetic and lithium insertion properties of spinel-type Li$_2$Mn$_3$MO$_8$ oxides (M=Mg, Co, Ni, Cu)", J. Mater. Chem., vol. 10, pp. 429-436 (2000).

(Continued)

*Primary Examiner* — Miriam Stagg
*Assistant Examiner* — Victoria Lynch
(74) *Attorney, Agent, or Firm* — Norman B. Thot

(57) ABSTRACT

A doped spinel comprising the formula:

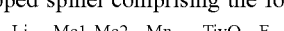

where, $0 \leq w < 1$, $0.3 < x \leq 0.7$, $0.3 \leq v < 0.7$, $x > v$, $0.0001 \leq y \leq 0.35$, and $0.0001 \leq z \leq 0.3$. Me1 is a metal selected from a group of elements consisting of Cr, Fe, Co, Ni, Cu, and Zn. Me2 is a metal selected from a group of elements consisting of Ni, Fe, Co, Mg, Cr, V, Ru, Mg, Al, Zn, Cu, Cd, Ag, Y, Sc, Ga, In, As, Sb, Pt, Au, and B.

1 Claim, 7 Drawing Sheets

(56) References Cited

OTHER PUBLICATIONS

J. Morales et al.: "New doped Li—M—Mn—O (M=Al, Fe, Ni) spinels as cathodes for rechargeable 3 V lithium batteries", J Solid State Electrochem, vol. 2, pp. 420-426 (1998).

M. Wagemaker et al.: "Extensive Migration of Ni and Mn by Lithation of Ordered $LiMg_{0.1}Ni_{0.4}Mn_{1.5}O_4$ Spinel", J. Am. Chem. Soc., vol. 126, pp. 13526-13533 (2004).

Y.-K. Sun et al.: "Effect of sulfur and nickel doping on morphology and electrochemical performance of $LiNi_{0.5}Mn_{1.5}O_{4-x}S_x$ spinel material in 3-V region", Journal of Power Sources, vol. 161, pp. 19-26 (2006).

S. H. Park et al.: "Comparative study of different crystallographic structure of $LiNi_{0.5}Mn_{1.5}O_{4-\delta}$ cathodes with wide operation voltage (2.0-5.0 V)", Electrochimica Acta, vol. 52, pp. 7226-7230 (2007).

C. S. Johnson et al.: "Lithium-manganese oxide electrodes with layered-spinel composite structures $xLi_2MnO_3 \cdot (1-x) Li_{1+y}Mn_{2-y}O_4$ ($0 < x < 1$, $0 \leq y \leq 0.33$) for lithium batteries", Electrochemistry Communications, vol. 7, pp. 528-536 (2005).

S. Glatthaar et al.: "Improved electrochemical performance of iron and flourine doped $LiNi_{0.5}Mn_{1.5}O_4$ cathodes with wide operation voltage", $219^{th}$ ECS Meeting Abstracts, Montréal, p. 1 (2011).

S. Glatthaar et al.: "Improvement of the wide operation voltage capability of iron doped $LiNi_{0.5}Mn_{1.5}O_4$ cathodes for lithium ion batteries by fluorination", LiBD-5, Electrode materials, Arcachon, France, pp. 1-2 (Jun. 12-17, 2011).

T. Ohzuku et al.: "Solid-state redox potentials for $Li[Mc_{1/2}Mn_{3/2}]O_4$ (Me: 3d-transition metal) having spinel-framework structures: a series of 5 volt materials for advanced lithium-ion batteries", Journal of Power Sources, vol. 81-82, pp. 90-94 (1999).

R. Alcántara et al.: "Synergistic Effects of Double Substitution in $LiNi_{0.5-y}Fe_yMn_{1.5}O_4$ Spinel as 5 V Cathode Materials", Journal of The Electrochemical Society, vol. 152, No. 1, pp. A13-A18 (2005).

R. Alcántara et al.: "Structural and Electrochemical Study of New $LiNi_{0.5}Ti_xMn_{1.5-x}O_4$ Spinel Oxides for 5-V Cathode Materials", Chem. Mater., vol. 15, pp. 2376-2382 (2003).

\* cited by examiner

DOPED SPINEL, METHOD FOR THE PRODUCTION THEREOF, THE USE THEREOF AND LITHIUM-ION BATTERY

CROSS REFERENCE TO PRIOR APPLICATIONS

The present application is a U.S. National Phase application under 35 U.S.C. §371 of International Application No. PCT/EP2013/000944, filed on Mar. 28, 2013 and which claims benefit to German Patent Application No. 10 2012 102 831.1, filed on Apr. 2, 2012. The International Application was published in German on Oct. 10, 2013 as WO 2013/149716 A1 under PCT Article 21(2).

FIELD

The present invention relates to a doped spinel, a process for preparation thereof and its use. The present invention also provides a lithium ion battery which comprises a spinel doped according to the present invention.

BACKGROUND

The present invention concerns the field of energy storage systems and relates to a subclass of cathode materials which are used as intercalation materials in lithium ion cells which are a main component of lithium ion batteries. A lithium ion cell is generally defined as an electrochemical element in which lithium ions occur as ionic charge carriers. The typical demands made of an energy store at the battery level, in particular, in respect of its energy density, power density, safety, longevity, environmental friendliness and costs, also apply at the cell level and ultimately for the individual components, i.e., also for cathode materials.

The present invention is based on the main class of the $LiMn_2O_4$ spinels, in particular, the $LiMe1_vMn_{1.5-v}O_4$ where Me1={Cr, Fe, Co, Ni, Cu, Zn}, 0.3≤v≤0.7, as described in T. Ohzuku et al., Journal of Power Sources 81-82, pp. 90-94 (1999) as high-voltage spinels. In contrast to other classes of cathode materials, especially $LiCoO_2$, $LiNi_xMn_yCo_zO_2$, $LiNi_xCo_yAl_zO_2$, this main class is, according to Arnold, G., Journal of Power Sources 119-121, pp. 247-251 (2003), known for a high power density combined with improved intrinsic safety. Further advantages are its environmental friendliness and the somewhat lower materials costs due to the absence of cobalt. The high-voltage spinel $LiNi_{0.5}Mn_{1.5}O_4$ has been the subject of intensive research during the last decade. A distinction is made between the ordered spinels having the space group $P4_332$ and the disordered spinels (Fd-3m), which, according to Yang, T., Journal of Alloys and Compounds 502, pp. 215-219 (2010) and Kunduraci, M., Chemistry of Materials 18, pp. 3585-3592 (2006), are more suitable as a cathode material because of improved electronic conductivity. Doping usually stabilizes the disordered spinel and partly or completely eliminates the $Li_xNi_{1-x}O$ foreign phase which frequently occurs in the synthesis.

R. Santhanam, B. Rambabu, Journal of Power Sources 195 pp. 5442-5451 (2010), G. Liu, L. Wen, Y. Liu, Journal of Solid State Electrochemistry 14, pp. 2191-2202 (2010), and T.-F. Yi, Y. Xie, M.-F. Ye, L.-J. Jiang, R.-S. Zhu, Y.-R. Zhu, Ionics 17, pp. 383-389 (2011) describe the high-voltage spinel $LiNi_{0.5}Mn_{1.5}O_4$, in particular, the influence of doping. On the cation side, nickel and manganese are partly replaced by magnesium, chromium, cobalt, iron, titanium, iron-titanium, copper, aluminum, zirconium and ruthenium, while on the anode side, oxygen is replaced by fluorine and sulfur. Many positive influences are ascribed to dopings as long as only small amounts, usually x≤0.15, are added, although different synthesis processes, morphologies, characterization methods and cell preparations make direct comparison of the influences of doping more difficult. The effects of doping in the high-voltage range, as described therein, are a slightly increased redox potential ($Mg^{2+}$, $Ti^{4+}$), reduced polarization ($Ru^{4+}$, $F^-$), improved cycling stability ($Mg^{2+}$, $Cr^{3+}$, $Fe^{3+}$, $F^-$), improved electronic conductivity ($Mg^{2+}$, $Cr^{3+}$, $Fe^{3+}$, $Co^{3+}$, $Ru^{4+}$), improved $Li^+$ ion conductivity ($Ti^{4+}$, $Co^{3+}$, $Ru^{4+}$), improved performance as a cathode material ($Cr^{3+}$, $Fe^{3+}$, $Ru^{4+}$, $F^-$), a greater binding energy to oxygen ($Cr^{3+}$, $Fe^{3+}$, $Co^{3+}$), improved structural stability ($Cr^{3+}$), improved heat resistance ($Cr^{3+}$, $F^-$), and improved resistance to the standard electrolyte ($Cr^{3+}$, $Fe^{3+}$, $F^-$). Fluorine here increases the resistance to hydrogen fluoride, while $Cr^{3+}$ and $Fe^{3+}$ are stated in Goodenough, J. B. et al., Journal of Power Sources 196, pp. 6688-6694 (2011) to reduce electrolyte oxidation at voltages above 4.5 V by formation of a passivating covering layer on the interface of the cathode material to the electrolyte (solid electrolyte interphase, known as SEI layer for short). Apart from $F^-$ doping, a greater stability to hydrogen fluoride, which can form in the standard electrolyte system, can, according to G. Liu, L. Wen, Y. Liu, Journal of Solid State Electrochemistry 14, pp. 2191-2202 (2010), be achieved by means of coatings.

The electrochemical results in respect of the influence of doping consist virtually exclusively of cycling in the high-voltage range, i.e., from 3.5 V to 5.0 V. Amine, K. et al., Journal of The Electrochemical Society 143, pp. 1607-1613 (1996), Strobel, P. et al., Journal of Material Chemistry 10, pp. 429-436 (2000), Morales, J. et al., Journal of Solid State Chemistry 2, pp. 420-426 (1998), and Wagemaker, M. et al., Journal of The American Chemical Society 143, pp. 13526-13533 (2004) describe the spinel $LiNi_{0.5-x}Mn_{1.5+x}O_4$ as 3V material. Specific capacities of up to 160 mAh/g during discharging from 3.5 V to 2.0 V after the first cycle were, however, not found to be stable after a number of cycles. Sun, Y.-K. et al, Journal of Power Sources 161 19-26, (2006) describes stable cycling of an $LiNi_{0.5}Mn_{1.5}O_4$ spinel prepared by precipitation within a voltage range from 3.5 V to 2.4 V relative to Li/$Li^+$ over 50 cycles, improved by doping with sulfur.

Electrochemical characterizations over the entire voltage range from 5.0 V to 2.0 V have only infrequently been carried out. They require additional lithium in the cell. Park et al., Electrochimica Acta 52, pp. 7226-7230 (2007) described the structural changes in the ordered and disordered spinel over the entire voltage range. The degradation of the 4V spinel $LiMn_2O_4$ over the voltage range from 5.0 V to 2.0 V is described in Johnson et al., Electrochemistry Communications 7, pp. 528-536 (2005). Glatthaar et al., 219th ECS Meeting Abstracts, Montréal, B1, 194 (2011) and Glatthaar et al., LiBD—Electrode Materials, Arcachon, O17 (2011) described results in respect of the deep discharging of iron- and fluorine-doped $LiNi_{0.5}Mn_{1.5}O_4$, which display an increase in the cycling stability brought about by doping with iron and fluorine in the voltage range from 2.0 V to 5.0 V.

SUMMARY

An aspect of the present invention is to provide a doped spinel which overcomes the disadvantages and restrictions described in the prior art. A doped spinel or a doped high-voltage spinel which can be cycled stably with significantly more than one lithium per formula unit should, for example, be provided.

An alternative aspect of the present invention is to provide a process for preparing the doped spinels or doped high-voltage spinels.

An alternative aspect of the present invention is to provide a use of the doped spinels or doped high-voltage spinels.

An alternative aspect of the present invention is to provide a lithium ion battery which comprises spinels or doped high-voltage spinels of this type.

In an embodiment, the present invention provides a doped spinel comprising the formula:

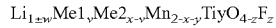

where, $0 \leq w < 1$, $0.3 < x \leq 0.7$, $0.3 \leq v < 0.7$, $x > v$, $0.0001 \leq y \leq 0.35$, and $0.0001 \leq z \leq 0.3$. Me1 is a metal selected from a group of elements consisting of Cr, Fe, Co, Ni, Cu, and Zn. Me2 is a metal selected from a group of elements consisting of Ni, Fe, Co, Mg, Cr, V, Ru, Mg, Al, Zn, Cu, Cd, Ag, Y, Sc, Ga, In, As, Sb, Pt, Au, and B.

BRIEF DESCRIPTION OF THE DRAWINGS

The present invention is described in greater detail below on the basis of embodiments and of the Figures in which.

DETAILED DESCRIPTION

Figure 1:
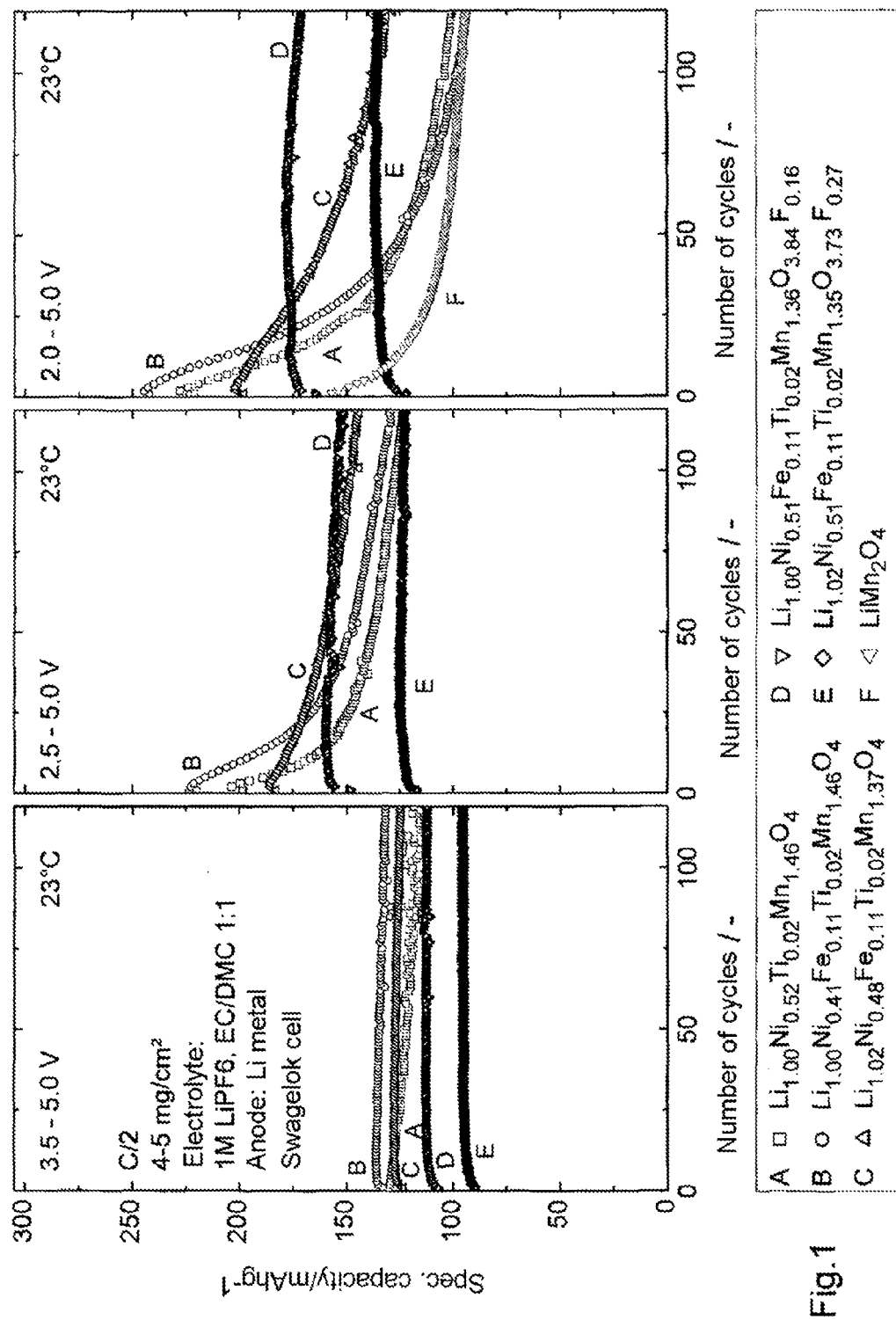
FIG. 1 shows specific discharging capacities of the samples A to E at 23° C. and different voltage ranges.

The material according to the present invention is a Ti-doped oxyfluoride-lithium-manganese spinel. In an embodiment, the spinel can, for example, have the composition:

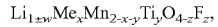

where, in the composition indicated,
$0 \leq w \leq 1$,
$0 \leq x \leq 0.7$,
$y \leq 0.3$,
$z \leq 0.3$, and Me is at least one element selected from the group of elements consisting of {Li, Ni, Fe, Co, Mg, Cr, V, Ru, Mg, Al, Zn, Cu, Cd, Ag, Y, Sc, Ga, In, As, Sb, Pt, Au, B}. The value range selected for w corresponds to the maximum possible stability range of a normal, i.e., non-inverse, Li-transition metal spinel. At values of z>0.3, the specific capacity decreases to an increasing extent for industrially relevant power densities.

In an embodiment of the present invention, a doped high-voltage spinel which has the formula:

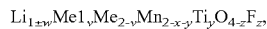

where $0.3 \leq v \leq 0.7$, in which $Me_x$ is replaced by $Me1_v$ $Me2_{x-v}$, Me1 is selected from the group of elements consisting of {Cr, Fe, Co, Ni, Cu, Zn} and Me2 is selected from the group of elements consisting of {Li, Ni, Fe, Co, Mg, Cr, V, Ru, Mg, Al, Zn, Cu, Cd, Ag, Y, Sc, Ga, In, As, Sb, Pt, Au, B}, can, for example, be provided.

In an embodiment of the present invention, the element Ni can, for example, be selected for Me1, with Me2, for example, being selected from the group consisting of {Cr, Fe, Co, Ni, Cu, Zn, Mg, V, Ru, Al}, for example, Cr, Fe or Ru, for example, Fe. In an embodiment, Me2=Fe, $0 \leq (x-v) \leq 0.4$, $0.0005 \leq y \leq 0.2$ and $0.0005 \leq z \leq 0.3$. For values of $(x-v) > 0.35$, the specific capacity in the voltage range>3.5 V of $LiNi_{0.5-(x-v)}Mn_{1.5}Fe_{(x-v)}O_4$ decreases again as described in Alcantara et al., Journal of The Electrochemical Society 152, pp. A13-A18 (2005). For values of y>0.35, the specific capacity in the voltage range>3.5 V of $LiNi_{0.5}Mn_{1.5-y}Ti_yO_4$ decreases again as described in Alcantara et al., Chemistry of Materials 15, pp. 2376-2382 (2003).

A spinel doped according to the present invention is obtained in good quality by a multistage preparative process. Firstly, a solution of Li, Mn, Me, Me1 and/or Me2 metal compounds and trifluoroacetic acid is spray dried. Subsequent calcination in a first furnace operation forms the spinel, for example, still without Ti doping. To introduce the Ti doping, the pulverulent material can, for example, be milled and spray-granulated as an ethanolic suspension in which a lithium salt and a Ti alkoxide has been dissolved, for example, as a sol. The product obtained in this way is converted into a Ti-doped oxyfluoride spinel according to the present invention in a second furnace operation.

The spinel doped according to the present invention makes it possible to cycle a spinel of the class $LiMn_2O_4$ or a high-voltage spinel of the class $LiMe1_vMn_{1.5-v}O_4$ where Me1={Cr, Fe, Co, Ni, Cu, Zn}, $0.3 \leq v \leq 0.7$, having significantly more than one lithium per formula unit over many cycles in a stable manner. For high cycling stability, specific capacities above 150 mAh/g were measured, which corresponds to the de/intercalation of one lithium per formula unit. Although improved resistance to the electrolyte and good cycling properties are known for doping with iron, fluorine-doped $LiNi_{0.5}Mn_{1.5}O_4$ has improved resistance to hydrogen fluoride and improved heat resistance and, finally, fluorine- and iron-doped $LiNi_{0.5}Mn_{1.5}O_4$ improves the reversibility of deep discharge down to 2.0 V, the class of materials according to the present invention of Ti-doped oxyfluoride spinels or high-voltage spinels combines, firstly, the above-mentioned positive influences and, in addition, achieves a higher energy density as a result of the de/intercalation of more than one lithium per formula unit. This also applies at elevated temperature in combination with a liquid electrolyte, which indicates improved aging stability.

In a range which is given by a doped spinel of the formula $Li_{1 \pm w}Ni_vFe_xMn_{2-x-y}Ti_yO_{4-x}F_z$ where:
$0 \leq w \leq 1$,
$0.3 \leq v \leq 0.7$,
$0 \leq x \leq 0.4$,
$0.0005 \leq y \leq 0.3$, and
$0.0005 \leq z \leq 0.3$, it is found that the doping element Fe increases electronic conductivity. Iron-doped $LiNi_{0.5}Mn_{1.5}O_4$ therefore gives better performance than undoped material. The specific capacity of iron-doped $LiNi_{0.5}Mn_{1.5}O_4$ is higher than that of undoped material at a medium discharge rate, i.e., over a period of 2 hours, not only in the high-voltage range but also in the 3V range. Fluorine doping improves the stability to hydrogen fluoride formation in the electrolyte and increases the thermal stability of the material since the spinel lattice is stabilized by the introduction of fluoride ions. The combination of iron doping and fluorine doping thus results overall in increased thermal stability and a greater cycling stability in the case of deep discharge.

In the case of deep discharge, the transformation of the cubic spinel lattice into a tetragonal lattice at medium discharging rates is hindered. As a result, the Fe—F-doped material is more stable to cycling but, due to the lower de/intercalation of Li in the 3V range, the specific capacity and energy density during cycling at 2.0-5.0 V increase only little compared to the capacity achieved during cycling at 3.5-5.0 V. Only doping with a third element allows the positive properties of the single doping, i.e., higher specific capacity as a result of iron doping, improved structural stability and improved resistance to the electrolyte as a result of fluorine doping, to be maintained in combination. The titanium-, fluorine- and iron-doped spinel thus displays an increased energy density combined with comparatively high cycling stability and thermal stability and is charged or discharged over the entire voltage range of 2.0-5.0 V in combination with a lithium anode.

The spinel or high-voltage spinel doped according to the present invention is suitable first and foremost for use as cathode material, for example, as an intercalation material, in lithium ion cells, for example, in lithium metal cells having lithium as an anode.

In an embodiment, the present invention provides a lithium ion battery which has at least one lithium ion cell whose cathode material contains a spinel or high-voltage spinel doped according to the present invention.

The present invention will be illustrated below with the aid of the working examples and the Figures.

As a working example, titanium-, fluorine- and iron-doped spinels were prepared and used as the cathode material. Doping was carried out via a modified sol-gel process, starting from aqueous metal salt solutions with addition of trifluoroacetic acid, by which means the following samples A to E were prepared.

EXAMPLES

Comparative Samples A to C

Sample A: $Li_{1.00}Ni_{0.52}Ti_{0.02}Mn_{1.46}O_4$
Sample B: $Li_{1.00}Ni_{0.41}Fe_{0.11}Ti_{0.02}Mn_{1.46}O_4$
Sample C: $Li_{1.02}Ni_{0.48}Fe_{0.11}T_{0.02}Mn_{1.37}O_4$ Samples D and E According to the Present Invention Sample D: $Li_{1.00}Ni_{0.51}Fe_{0.11}Ti_{0.02}Mn_{1.36}O_{3.84}F_{0.16}$
Sample E: $Li_{1.02}Ni_{0.51}Fe_{0.11}Ti_{0.02}Mn_{1.35}O_{3.73}F_{0.27}$ All samples were doped with titanium. Samples B to E additionally comprised Fe, while samples D and E additionally contained fluorine, so that only these two samples D and E fall within the class of materials according to the present invention. Samples A to C should therefore be regarded as comparative samples.

The composition of the samples was determined by means of chemical analysis and corresponds to the stoichiometric amounts weighed in. Except for sample A, which contained a small proportion of $Li_xNi_{1-x}O$ as a foreign phase, all samples were phase-pure according to X-ray diffraction. All samples were disordered spinels which, according to BET measurements, had specific surface areas of from 2.9 to 5.9 $m^2/g$ and, according to scanning electron micrographs, had comparable morphologies. Since the synthesis conditions were chosen to be the same for all samples, the differences in the electrochemical properties shown in FIGS. 1-7 actually show the respective influences of doping.

For the cell tests, 2-electrode Swagelok cells having lithium as the anode, 1M $LiPF_6$ in EC/DMC 1:1 as the electrolyte and the samples A to E as the active material of the cathode were used. The cathode consisted of 80% of active material, 10% of polyvinylidene fluoride (PVDF), and 10% of carbon black. Specific values indicated are based on the mass of the active material.

FIG. 1 shows the specific discharging capacities of samples A to E at 23° C. and different voltage ranges. In the high-voltage range, i.e., in the range from 3.5 V to 5 V, stable cycling was possible for all pure-phase samples. The advantages of the class of the materials according to the present invention in samples D and E become apparent, however, over the total voltage range. Over the first 50 cycles, there is, as shown in FIG. 1, no decrease in the specific capacity to be observed for these two samples. Sample D has a specific capacity of 176 mAh/g after 10 cycles.

Figure 2:
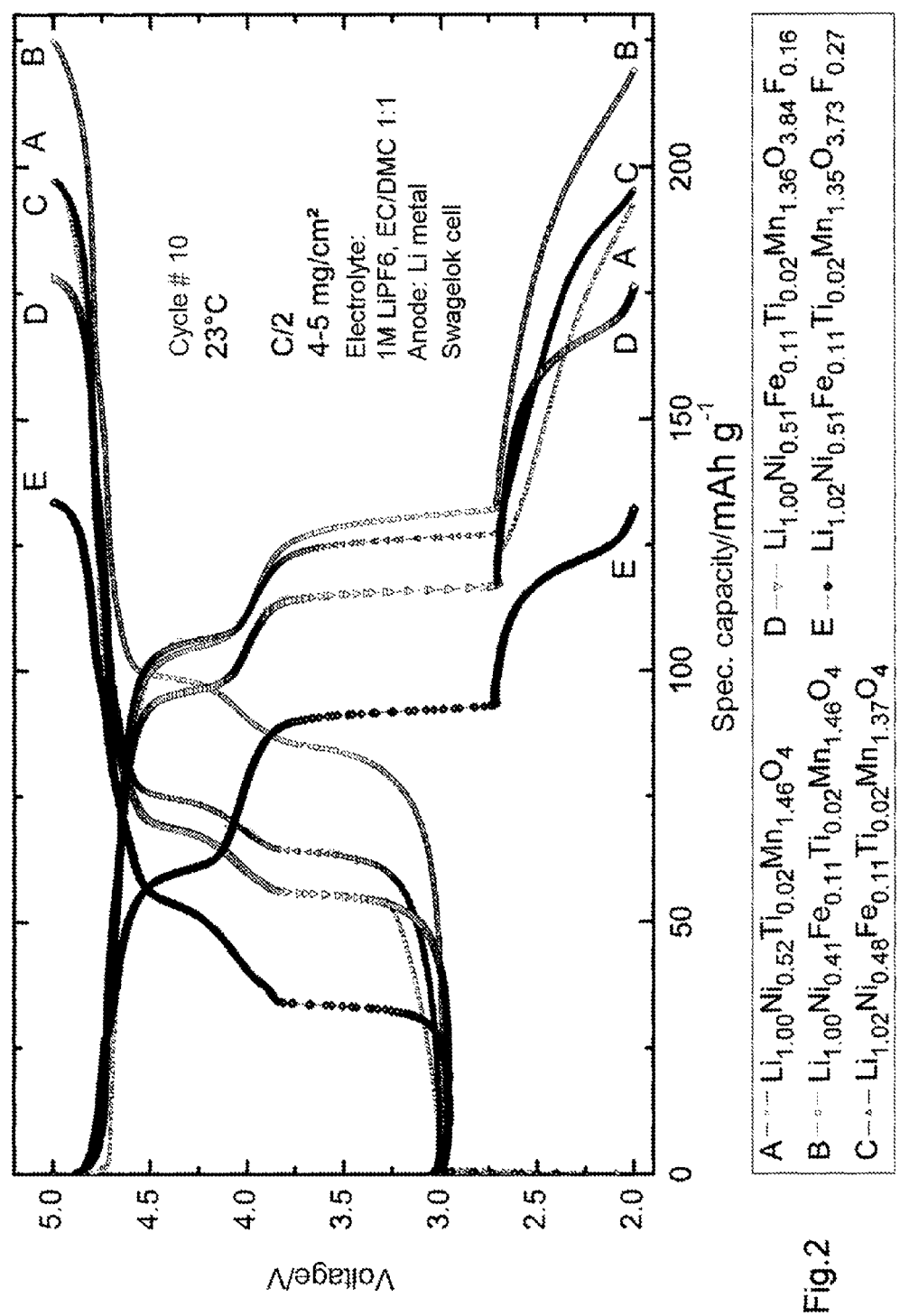
FIG. 2 shows charging and discharging curves of the samples A to E at 23° C. in the voltage range from 5.0 V to 2.0 V after 10 cycles.

If the theoretical specific capacity of 147 mAh/g corresponds to the lithium intercalation of one lithium into $Li_{1-w}Ni_{0.5}Mn_{1.5}O_4$ where $0 \leq w \leq 1$ in the high-voltage range, more than one lithium per formula unit is, as shown in FIG. 2, cycled in the voltage range from 5.0 V to 2.0 V in the case of samples B to E after 10 cycles, since these have a specific capacity higher than 147 mAh/g.

Figure 3:
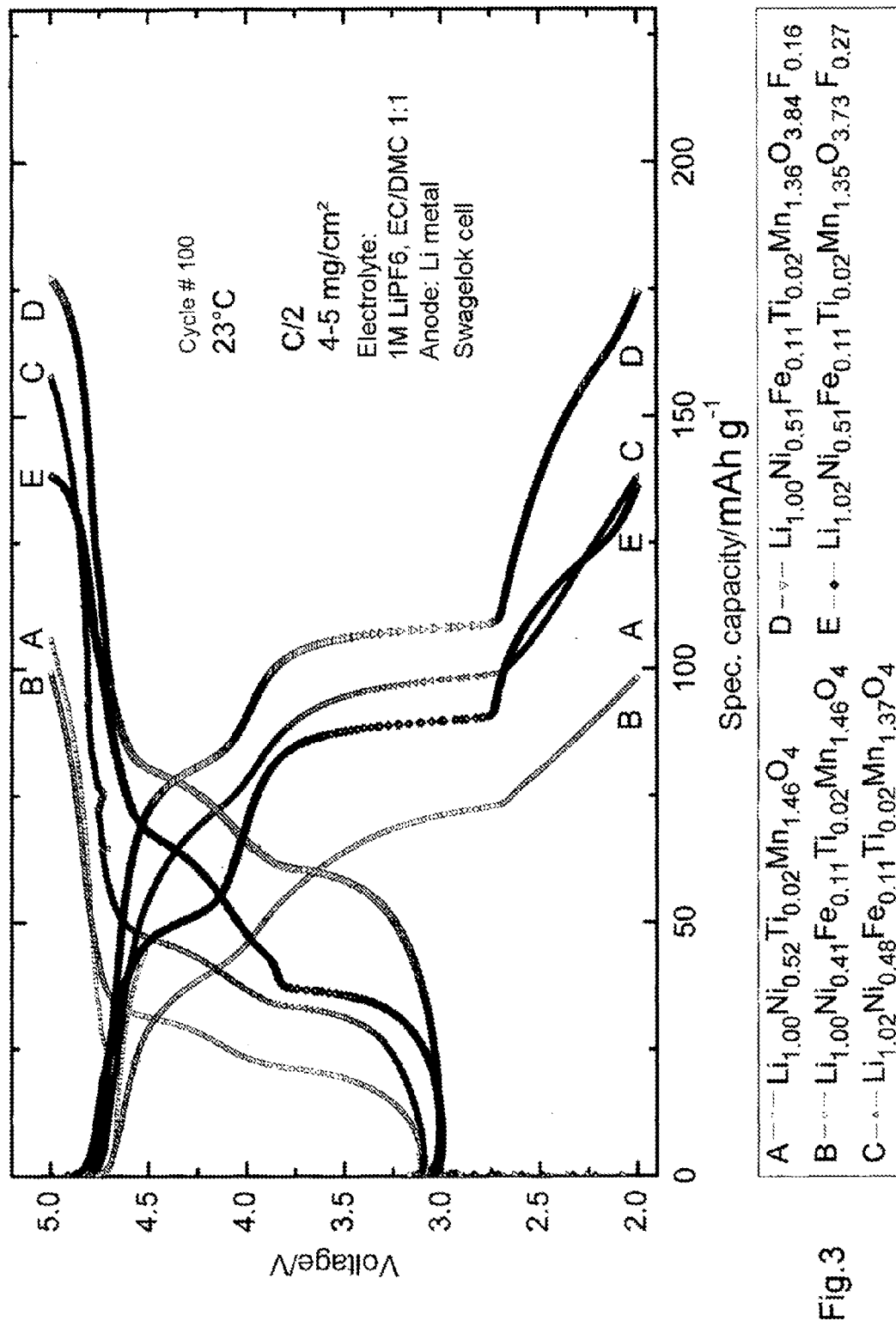
FIG. 3 shows charging and discharging curves of the samples A to E at 23° C. in the voltage range from 5.0 V to 2.0 V after 100 cycles.

As shown in FIG. 3, in contrast, only the samples D and E according to the present invention display comparably high specific capacities as after 10 cycles after 100 cycles. Sample D is the only sample which still displays a specific capacity of 174 mAh/g, i.e., greater than 147 mAh/g, after 100 cycles. It is thus demonstrated that significantly more than one lithium per formula unit is intercalated in the case of sample D over 100 cycles at a C rate of C/2.

Figure 4:
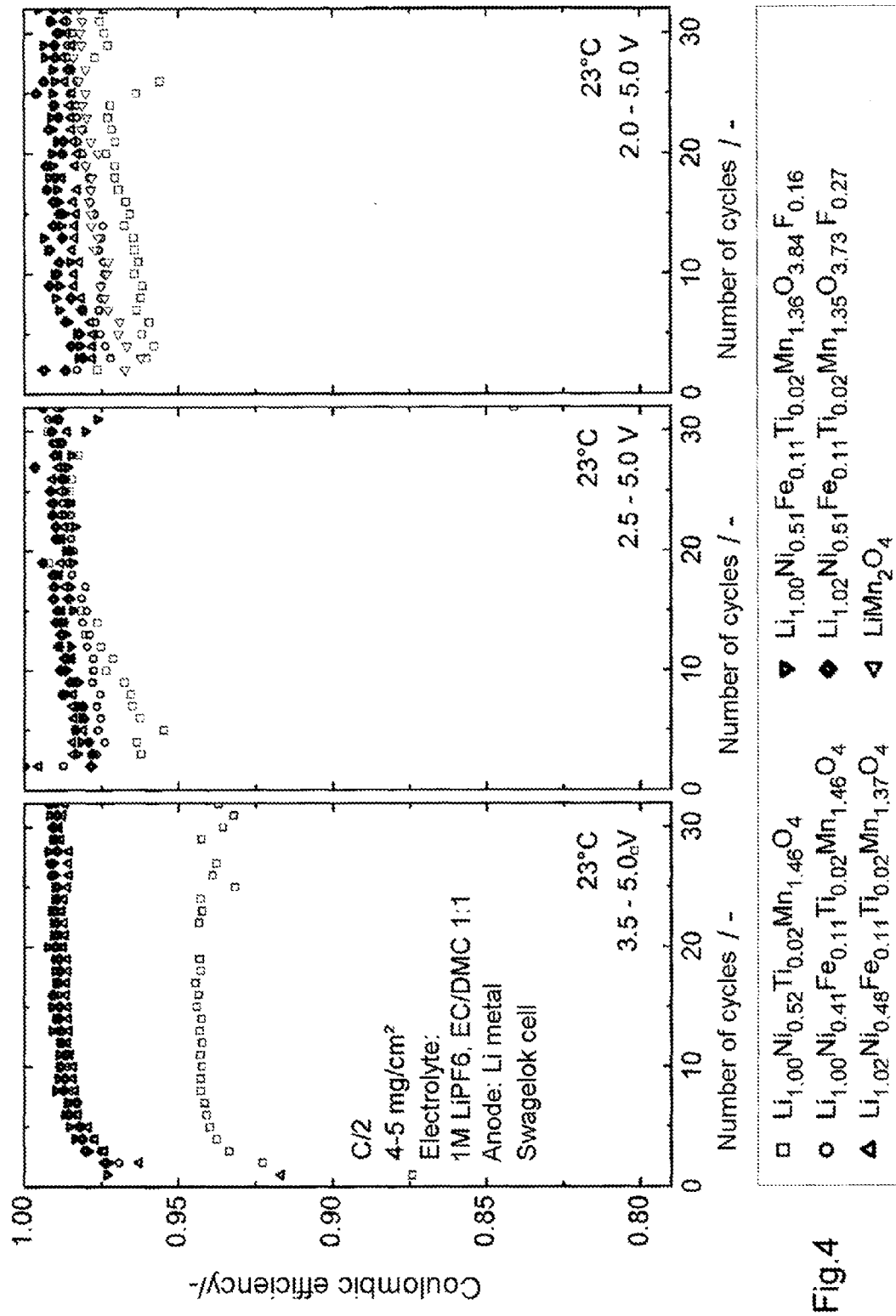
FIG. 4 shows the coulombic efficiency of the samples A to E at 23° C. and different voltage ranges.

FIG. 4 shows the coulombic efficiency of the samples in the first 30 cycles; this is defined as the ratio of discharging capacity to charging capacity. A coulombic efficiency of less than 1.0 indicates irreversible electrochemical secondary reactions. Possible causes are SEI formation, electrolyte decomposition, or dissolution of $Mn^{2+}$ in the electrolyte. It is conspicuous in FIG. 4 that the coulombic efficiency is less than 1 for all samples. It is obvious that this reduction in the coulombic efficiency occurring even in the high-voltage range is attributable to the electrolyte used not being stable at above 4.5 V. It is interesting, however, that in the case of the two samples D and E which have been fluorine-doped according to the present invention there is, in contrast to samples A to C, no significant further reduction in the coulombic efficiency in the entire voltage range of 2.0-5.0 V, which represents an improvement over the samples which have not been fluorine-doped.

Figure 5:
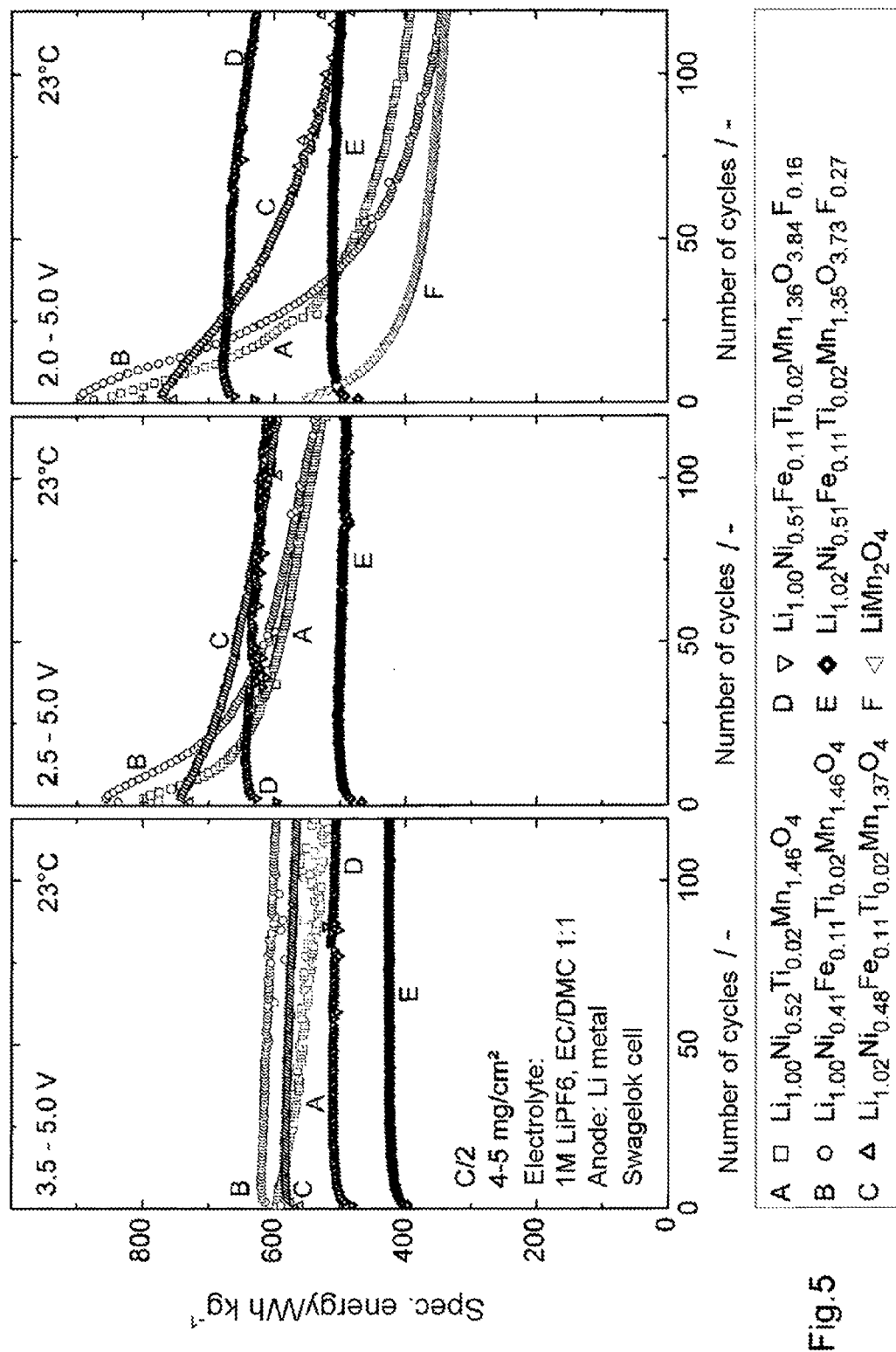
FIG. 5 shows specific energy densities of the samples A to E at 23° C. and different voltage ranges.
Figure 6:
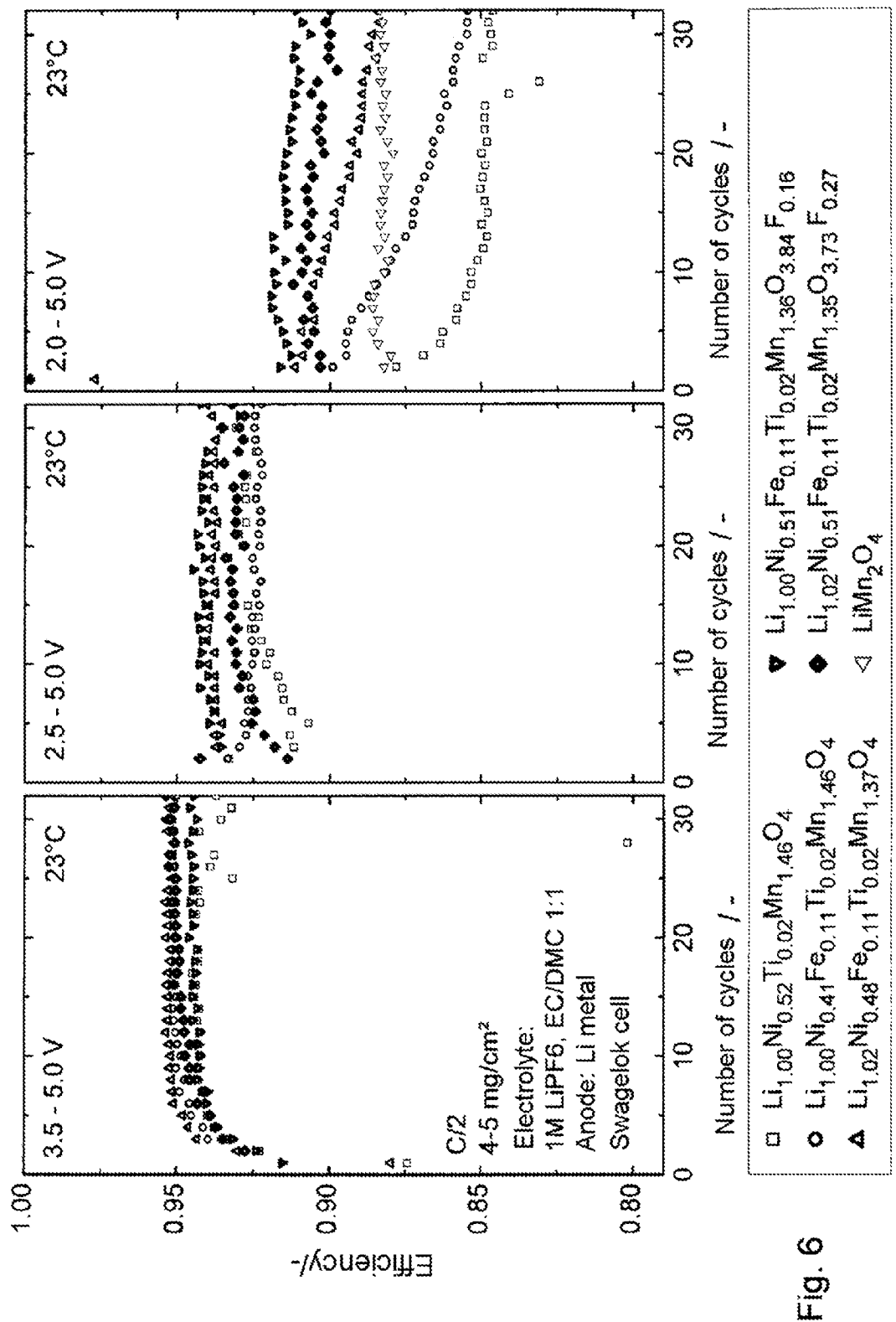
FIG. 6 shows efficiency of the samples A to E at 23° C. and different voltage ranges.

FIG. 5 shows the cycle-dependent specific discharging energy and FIG. 6 shows the efficiency of the samples. As in the case of the specific capacity, the samples D and E also cycle significantly more stably in terms of the energy density over the entire voltage range from 5.0 V to 2.0 V than the samples A to C which were not doped with fluorine. In the case of sample D, the energy density decreases slightly after 50 cycles in the right-hand graph. This is related to a voltage hysteresis in the 3V range which increases with increasing number of cycles, as the comparison of FIG. 2 and FIG. 3 for this sample shows.

The efficiency comprises energy losses due to the coulombic efficiency and losses due to the voltage difference between charging and discharging. Since cycling was carried out at a charging and discharging rate of C/2, i.e., 2 hours charging and 2 hours discharging, the efficiency shown includes kinetic losses which lead to an overvoltage. The decrease in the efficiency is conspicuous in a cycle over the entire voltage range. The reason lies in the greater voltage hysteresis in the 3V range, which is caused by the energy losses in the phase transformation from cubic to tetragonal. It is conspicuous that improved efficiencies are once again achieved by the samples fluorine-doped according to the present invention.

Figure 7:
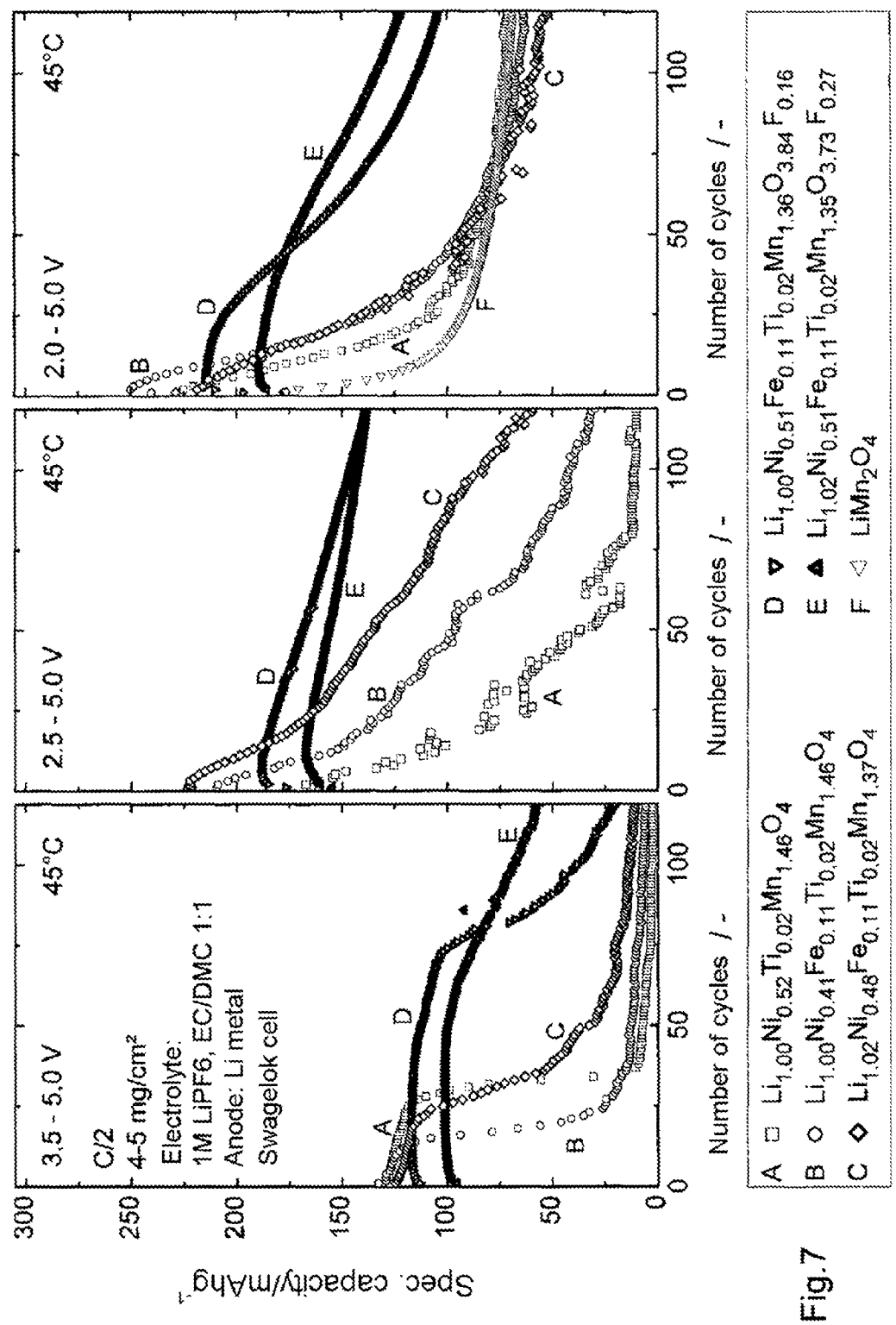
FIG. 7 shows specific discharging capacities of the samples A to E at 45° C. and different voltage ranges.

FIG. 7 shows the specific capacities at 45° C. Samples D and E can be cycled stably over the first 50 cycles in the high-voltage range, which represents an improvement compared to the high-voltage spinels which have not been fluorine-doped in samples A to C. Relative improvements are likewise apparent over the entire voltage range. It is expected that the cycling stability can also be increased further at elevated temperature both by optimization of the material according to the present invention and by optimization in cell manufacture.

The present invention is not limited to embodiments described herein; reference should be had to the appended claims.

What is claimed is:

1. A doped spinel comprising the formula

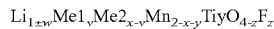

where,
0≤w<1,
0.3<x≤0.7,
0.3≤v<0.7,
x>v,
0.0001≤y≤0.35,
0.0001≤z≤0.3,
Me1 is a metal selected from a group of elements consisting of Cr, Fe, Co, Ni, Cu, and Zn, and
Me2 is a metal selected from a group of elements consisting of Ni, Fe, Co, Mg, Cr, V, Ru, Mg, Al, Zn, Cu, Cd, Ag, Y, Sc, Ga, In, As, Sb, Pt, Au, and B,
wherein, a specific capacity of the doped spinel from 1 to 50 cycles did not decrease in a voltage range of from 2.0 to 5.0 V, and
the doped spinel is prepared by a process consisting of:
providing a solution of a metal-organic and/or inorganic Li, Mn, Me, Me1 and/or Me2 compound(s) as a precursor;
spray drying the precursor with trifluoroacetic acid so as to obtain a sprayed precursor;
calcining the sprayed precursor so as to provide the doped spinel in a form of a pulverulent material;
milling the pulverulent material in ethanol so as to provide a suspension;
adding a lithium compound and a titanium alkoxide in an ethanolic solution to the suspension so as to provide a resulting material;
spray granulating the resulting material so as to obtain a spray-granulated material; and
thermally converting the spray-granulated material so as to obtain a Ti-doped oxyfluoride spinel.

* * * * *